US011585828B2

(12) United States Patent
Takeda

(10) Patent No.: US 11,585,828 B2
(45) Date of Patent: Feb. 21, 2023

(54) SENSOR SYSTEM AND SENSOR DROP DETERMINATION METHOD

(71) Applicant: SEIKO EPSON CORPORATION, Tokyo (JP)

(72) Inventor: Kazuyoshi Takeda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 16/777,287

(22) Filed: Jan. 30, 2020

(65) Prior Publication Data

US 2020/0249253 A1 Aug. 6, 2020

(30) Foreign Application Priority Data

Feb. 1, 2019 (JP) .............................. JP2019-016848
Sep. 30, 2019 (JP) .............................. JP2019-179333

(51) Int. Cl.
*G01P 15/18* (2013.01)
*G01P 15/08* (2006.01)

(52) U.S. Cl.
CPC .............. *G01P 15/08* (2013.01); *G01P 15/18* (2013.01)

(58) Field of Classification Search
None
See application file for complete search history.

(56) References Cited

U.S. PATENT DOCUMENTS

| 7,328,615 | B2* | 2/2008 | Kwon | .................... G11B 19/04 73/488 |
| 10,043,368 | B1* | 8/2018 | Fonzi, III | ........... G08B 21/0446 |
| 2005/0141127 | A1* | 6/2005 | Shimotono | .......... G11B 19/043 360/75 |
| 2007/0067139 | A1* | 3/2007 | Kobayashi | .............. G01P 15/18 |
| 2010/0172052 | A1* | 7/2010 | Shibata | ..................... G11B 5/54 360/97.12 |
| 2011/0149431 | A1 | 6/2011 | Shibata | |
| 2014/0039828 | A1* | 2/2014 | Kasama | .............. G01P 15/0891 702/141 |

(Continued)

FOREIGN PATENT DOCUMENTS

| CN | 101382559 | 3/2009 |
| EP | 1521087 B | 4/2005 |

(Continued)

OTHER PUBLICATIONS

Espacenet machine translation, Nakajima Masahiro, Information Processing Device, Information Processing Method, and Program, JP2013157055A, Aug. 15, 2013 (Year: 2013).*

(Continued)

*Primary Examiner* — Eman A Alkafawi
*Assistant Examiner* — Denise R Karavias
(74) *Attorney, Agent, or Firm* — Workman Nydegger

(57) ABSTRACT

A sensor system includes a sensor that is provided in a structure and detects an acceleration, a storage unit that stores installation information indicating a relationship between a direction of a gravitational acceleration and a direction of a detection axis of the sensor, and a drop determination unit that determines whether or not the sensor is dropped based on a representative value of accelerations in the direction of the detection axis detected by the sensor and a gravitational acceleration value in the direction of the detection axis specified based on the installation information.

6 Claims, 11 Drawing Sheets

(56) References Cited

U.S. PATENT DOCUMENTS

2016/0187368 A1* 6/2016 Modi .................... G08B 29/04
702/141

FOREIGN PATENT DOCUMENTS

| | | |
|---|---|---|
| JP | 2005-114402 A | 4/2005 |
| JP | 2007-095182 A | 4/2007 |
| JP | 2009-063563 A | 3/2009 |
| WO | 2010/010781 A | 1/2010 |

OTHER PUBLICATIONS

Espacenet machine translation, Zhang et al., Terminal Acceleration Data Processing Method and Device, CN105866469A, Aug. 17, 2016 (Year: 2016).*

Espacenet machine translation, Hashimoto Hidetaka, Drop Impact Detection Device, JP2013130532A, Jul. 4, 2013 (Year: 2013).*

//Espacenet machine translation, Zhang Qiang et al., Terminal Acceleration Data Processing Method and Device, CN105866469A, Aug. 17, 2016 (Year: 2016).*

\* cited by examiner

SENSOR SYSTEM AND SENSOR DROP DETERMINATION METHOD

The present application is based on, and claims priority from JP Application Serial Number 2019-016848, filed Feb. 1, 2019 and JP Application Serial Number 2019-179333, filed Sep. 30, 2019, the disclosure of which is hereby incorporated by reference herein in its entirety.

BACKGROUND

1. Technical Field

The present disclosure relates to a sensor system and a sensor drop determination method.

2. Related Art

In International Publication No. 2010/010781, a drop detection device is described which detects an acceleration in directions along three axes orthogonal to each other, obtains a determination value that is a difference between a detection value in a direction along one axis as a reference and an acceleration value in directions along the other two axes, and determines to be dropped when a state where a determination value is in a predetermined value range continues for a predetermined time or more.

However, the drop detection device described in International Publication No. 2010/010781 detects a drop state by using the fact that an acceleration becomes 0 G during drop, and there is a problem that, if the drop state cannot be detected, it is not possible to determine that drop is made after the drop.

SUMMARY

An aspect of a sensor system according to the present disclosure includes a sensor that is provided in a structure and detects an acceleration, a storage unit that stores installation information indicating a relationship between a direction of a gravitational acceleration and a direction of a detection axis of the sensor, and a drop determination unit that determines whether or not the sensor is dropped based on a representative value of accelerations in the direction of the detection axis detected by the sensor and a gravitational acceleration value in the direction of the detection axis specified based on the installation information.

In the aspect of the sensor system, the drop determination unit may determine that the sensor is dropped when an absolute value of a difference between the representative value of the accelerations detected by the sensor and the gravitational acceleration value is greater than a determination value in the direction of the detection axis.

In the aspect of the sensor system, the sensor may have a plurality of the detection axes in different directions, and the drop determination unit may determine that the sensor is dropped when the absolute value of the difference is greater than a determination value in any one or more of the directions of the plurality of detection axes.

In the aspect of the sensor system, the sensor may have a plurality of the detection axes in different directions, and the drop determination unit may determine that the sensor is dropped when an absolute value of a difference between the representative value of the accelerations detected by the sensor and the gravitational acceleration value is greater than a first determination value in any two or more of the directions of the plurality of detection axes.

In the aspect of the sensor system, the sensor may have a plurality of the detection axes in different directions, and the drop determination unit may determine that the sensor is dropped when a difference between an absolute value of the representative value of the accelerations detected by the sensor and an absolute value of the gravitational acceleration value is greater than a first determination value in any two or more of the directions of the plurality of detection axes.

In the aspect of the sensor system, the drop determination unit may determine that the sensor is dropped when the absolute value of the difference is greater than a second determination value in any one or more of the directions of the plurality of detection axes.

In the aspect of the sensor system, the representative value may be an average value or a median value.

In the aspect of the sensor system, the storage unit may store a determination result by the drop determination unit, and the drop determination unit may not perform the determination when the determination result stored in the storage unit indicates that the sensor is dropped.

In the aspect of the sensor system, the sensor system may further include an arithmetic unit that performs an arithmetic based on an acceleration value detected by the sensor, and when it is determined that the sensor is dropped, the drop determination unit may not output the acceleration value detected by the sensor to the arithmetic unit.

In the aspect of the sensor system, the sensor system may further include an output unit that outputs a determination result by the drop determination unit to an outside of the sensor system.

An aspect of a sensor drop determination method according to the present disclosure includes a data acquisition step of acquiring an output signal of a sensor that is provided in a structure and detects an acceleration, a representative value calculation step of calculating a representative value of accelerations in a direction of a detection axis detected by the sensor, based on an output signal of the sensor, and a drop determination step of determining whether or not the sensor is dropped based on the representative value of the acceleration in the direction of the detection axis, and a gravitational acceleration value in the direction of the detection axis specified based on installation information indicating a relationship between a direction of a gravitational acceleration stored in the storage unit and the direction of the detection axis of the sensor.

DESCRIPTION OF EXEMPLARY EMBODIMENTS

Hereinafter, preferred embodiments of the present disclosure will be described in detail with reference to the drawings. Embodiments which will be described below do not unduly limit contents of the present disclosure described in the appended claims. Further, all the configurations which will be described below are not essential configuration requirements of the present disclosure.

A sensor system according to the present disclosure can be used in various systems. Hereinafter, a structure monitoring system using the sensor system according to the present disclosure will be described as an example.

1. First Embodiment 1-1. Configuration of Structure Monitoring System

Figure 1:
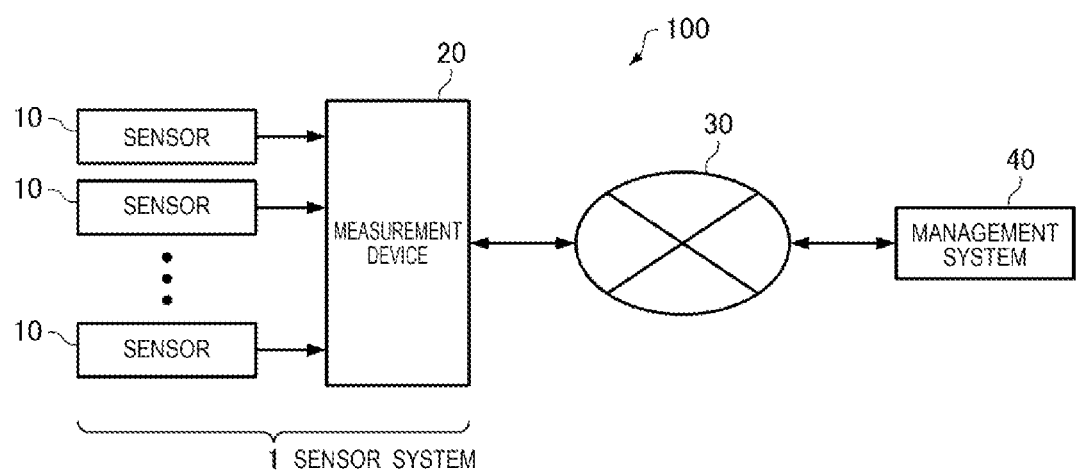
FIG. 1 is a diagram illustrating a configuration of a structure monitoring system according to a first embodiment.

FIG. 1 is a diagram illustrating a configuration of a structure monitoring system according to a first embodiment. As illustrated in FIG. 1, the structure monitoring system 100 includes a sensor system 1 and a management system 40. The sensor system 1 includes n sensors 10 and a measurement device 20. Here, n is an integer greater than or equal to 1.

Each of the n sensors 10 is an acceleration sensor which is provided on a structure, includes a plurality of detection axes in different directions, and detects accelerations in directions of the plurality of detection axes, and may be, for example, a quartz acceleration sensor or a micro electromechanical systems (MEMS) acceleration sensor. In the present embodiment, each of the n sensors 10 has three detection axes of an X axis, a Y axis, and a Z axis that are orthogonal to each other, and detects an acceleration in the X-axis direction, the Y-axis direction, and the Z-axis direction.

Figure 2:
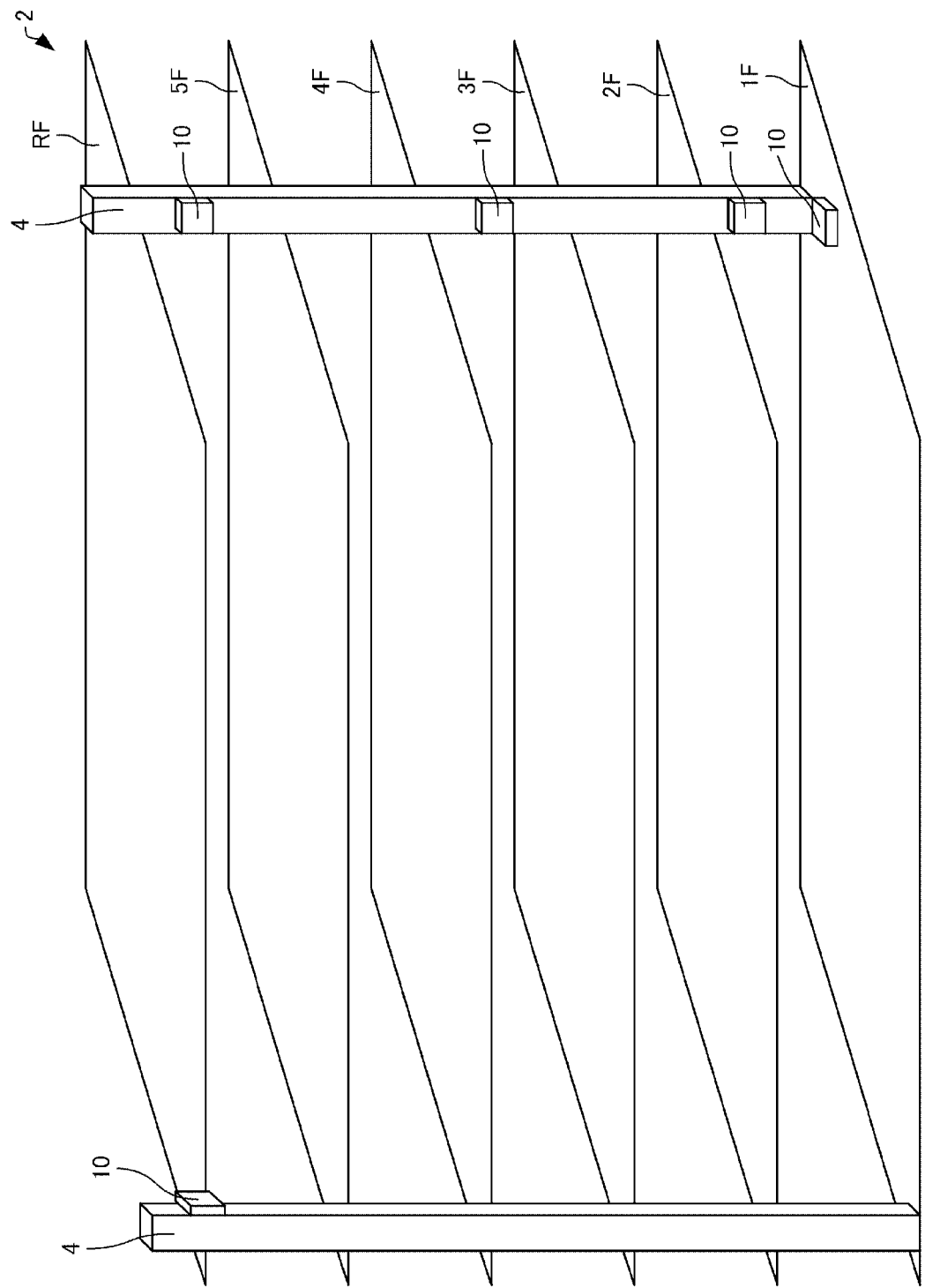
FIG. 2 is a diagram illustrating an example of a state where a plurality of sensors are attached to a building.

The structure provided with the n sensors 10 may be a stationary structure, that is, a structure that does not move with respect to a ground surface. FIG. 2 is a diagram illustrating an example of a state in which the n sensors 10 are attached to a building 2 that is the structure. In the example of FIG. 2, the building 2 is a five-floor building including floors 1F to 5F, a roof RF, and a steel column 4, and the five sensors 10 are attached to the building 2. Specifically, the four sensors 10 are attached to the steel column 4 at four positions of a position between the floor 1F and the floor 2F, a position between the floor 3F and the floor 4F, a position between the floor 5F and the roof RF, and the roof RF, respectively. Further, one sensor 10 is attached to the floor 1F. As described above, in the example of FIG. 2, the five sensors 10 are provided at different positions of the building 2. However, an arrangement and the number of sensors 10 are not limited in particular and can be changed as appropriate depending on a size and a shape of the structure.

Referring back to FIG. 1, each of the n sensors 10 and the measurement device 20 are coupled to each other by a communication bus (not illustrated), for example, a controller area network (CAN), and the measurement device 20 communicates with the n sensor 10 via the communication bus. The CAN is suitable for the present embodiment in that the CAN is a highly reliable communication mode which is resistant to an error and noise. However, the communication between each of the n sensors 10 and the measurement device 20 may be coupled to each other by other communication bus specifications or a local area network (LAN), and the present disclosure is not limited to the CAN. The communication between each sensor 10 and the measurement device 20 may be a wired communication or a wireless communication. Further, the measurement device 20 communicates with a management system 40 via a communication network 30. The communication network 30 may be a public line such as the Internet.

Each of the n sensors 10 measures an acceleration generated by vibration of the structure and transmits the measured acceleration data to the measurement device 20. The measurement device 20 receives the acceleration data from each of the n sensors 10, generates information on a state of the structure based on the acceleration data, and transmits the information to the management system 40. The information on the state of the structure may include information such as a displacement of the structure and a degree of fatigue.

The measurement device 20 is installed inside the structure or installed at a position near the structure in the outside of the structure. Further, the management system 40 is installed in a remote place spaced apart from the structure. A surveillant can monitor a state of the structure even from the remote place via the management system 40. However, installation positions of the measurement device 20 and the management system 40 are not limited in particular.

1-2. Configuration of Measurement Device

Figure 3:
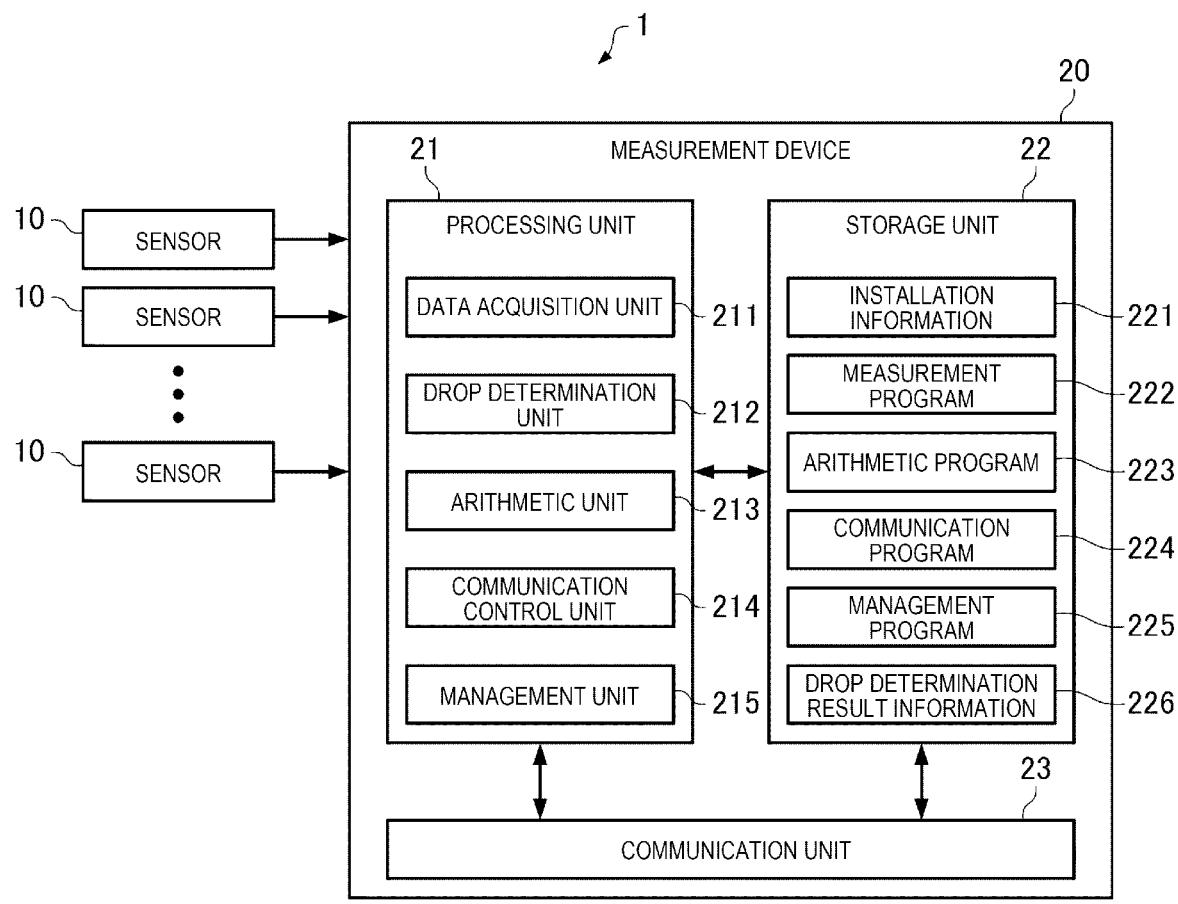
FIG. 3 is a diagram illustrating a configuration example of a measurement device according to the first embodiment.

FIG. 3 is a diagram illustrating a configuration example of the measurement device 20. As illustrated in FIG. 3, the measurement device 20 includes a processing unit 21, a storage unit 22, and a communication unit 23.

The storage unit 22 stores installation information 221. The installation information 221 represents a relationship between a direction of a gravitational acceleration and a direction of each detection axis of each sensor 10 in a state where the respective sensors 10 are attached to the structure. For example, in a state where the sensor 10 is attached to the structure such that the Y-axis direction is vertically upward, a gravitational acceleration value in the Y-axis direction is −1 G, and gravitational acceleration values in the X-axis direction and the Z-axis direction are 0 G. Thus, the installation information 221 may include information indicating that the gravitational acceleration values of the sensor 10 in the X-axis direction, the Y-axis direction, and the Z-axis direction are 0 G, −1 G, and 0 G, respectively.

Further, the storage unit 22 stores a measurement program 222, an arithmetic program 223, a communication program 224, and a management program 225.

The storage unit 22 may include semiconductor memories such as a static random access memory (SRAM) and a dynamic random access memory (DRAM), or a volatile memory such as a register. Further, the storage unit 22 may include semiconductor memories such as an electrically erasable programmable read only memory (EEPROM) and a flash memory, or nonvolatile memories, for example, a magnetic storage device such as a hard disk device, and an optical storage device such as an optical disk device.

The communication unit 23 is an interface unit for enabling the measurement device 20 to communicate with the management system 40. In the present embodiment, the processing unit 21 transmits various types of information obtained by arithmetic performed by an arithmetic unit 213 to the management system 40 via the communication unit 23. Further, the management system 40 transmits the latest versions of various programs to the storage unit 22 via the communication unit 23.

The processing unit 21 includes a data acquisition unit 211, a drop determination unit 212, the arithmetic unit 213, a communication control unit 214, and a management unit 215.

In the present embodiment, the processing unit 21 is a processor such as a central processing unit (CPU), a graphics processing unit (GPU), or a digital signal processor (DSP), and functions as each unit described above by executing various programs stored in the storage unit 22 that is an information storage device. Specifically, the processing unit 21 functions as the data acquisition unit 211 and the drop determination unit 212 by executing the measurement program 222. Further, the processing unit 21 functions as the arithmetic unit 213 by executing the arithmetic program 223. The processing unit 21 functions as the communication control unit 214 by executing the communication program 224. The processing unit 21 functions as the management unit 215 by executing the management program 225.

The data acquisition unit 211 acquires acceleration data that is output signals of the n sensors 10.

The drop determination unit 212 determines whether or not each sensor 10 is dropped based on a representative value of accelerations in the directions of each detection axis detected by each sensor 10 and a gravitational acceleration value in the direction of each detection axis of each sensor 10 specified based on the installation information 221. In the present embodiment, the drop determination unit 212 determines whether or not each of the n sensors 10 is dropped in a predetermined cycle and stores the determination result as drop determination result information 226 in the storage unit 22. Detailed processing of the drop determination unit 212 will be described below.

The arithmetic unit 213 performs arithmetic based on the acceleration value detected by each sensor 10. The arithmetic unit 213 performs the arithmetic for calculating, for example, a displacement of the structure, a degree of fatigue, and the like.

The communication control unit 214 controls a communication operation with the management system 40 by the communication unit 23.

The management unit 215 monitors whether or not the data acquisition unit 211, the drop determination unit 212, the arithmetic unit 213, and the communication control unit 214 operate normally. When any of the data acquisition unit 211, the drop determination unit 212, the arithmetic unit 213, and the communication control unit 214 performs an abnormal operation, the management unit 215 ends a corresponding program and restarts the program. Further, the management unit 215 monitors whether or not the latest versions of each of the measurement program 222, the arithmetic program 223, and the communication program 224 are stored in the storage unit 22. When the latest version of any program is stored in the storage unit 22, the management unit 215 ends a corresponding program, updates the program to a program of the latest version, and then restarts the program.

1-3. Sensor Drop Detection Method

Figure 4:
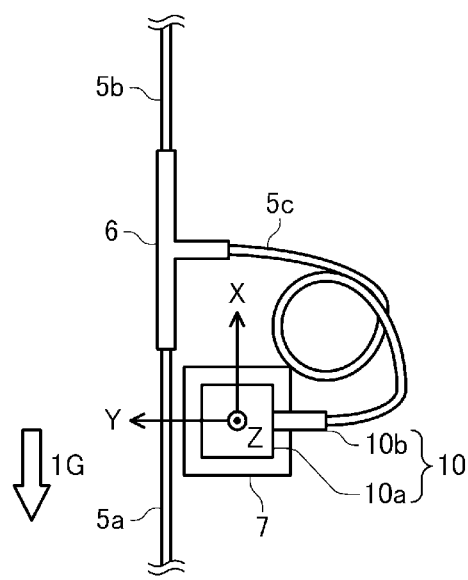
FIG. 4 is a diagram illustrating an example of a state where a sensor is attached to a structure.

FIG. 4 is a diagram illustrating an example of a state in which the sensor 10 is attached to a structure. Further, FIG. 5 is a diagram illustrating another example of the state in which the sensor 10 is attached to the structure.

Figure 5:
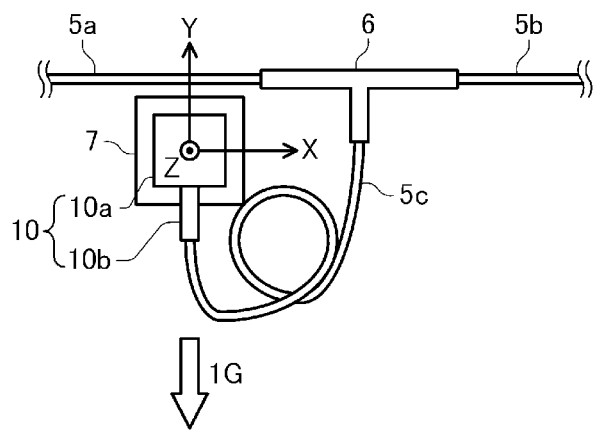
FIG. 5 is a diagram illustrating another example of a state where the sensor is attached to the structure.

In FIGS. 4 and 5, cables 5a, 5b, and 5c and a T-shaped connector 6 configure a part of a communication bus. One end of each of the cables 5a, 5b, and 5c is coupled to the T-shaped connector 6. The other end of the cable 5c is coupled to a connector 10b of the sensor 10. Further, although not illustrated, the other ends of the cables 5a and 5b are coupled to other T-shaped connectors, respectively. The T-shaped connector (not illustrated) is coupled to the connector 10b of another sensor 10 (not illustrated) or a connector of the measurement device 20. A sensor body 10a of the sensor 10 is fixed to a magnet jig 7 by a screw or the like, and the magnet jig 7 is attached to a metal portion of the structure by a magnetic force.

In the example of FIG. 4, the T-shaped connector 6 is attached to the structure such that the cables 5a and 5b are substantially vertical, and the magnet jig 7 is attached to the structure such that the X-axis direction of the sensor 10 is opposite to the gravitational acceleration direction. Accordingly, the gravitational acceleration value in the X-axis direction is −1 G, and the gravitational acceleration values in the Y-axis direction and the Z-axis direction are 0 G. Thus, the installation information 221 includes information indicating that the gravitational acceleration values of the sensor 10 in the X-axis direction, the Y-axis direction, and the Z-axis direction are, for example, −1 G, 0 G, and 0 G, respectively.

Figure 6:
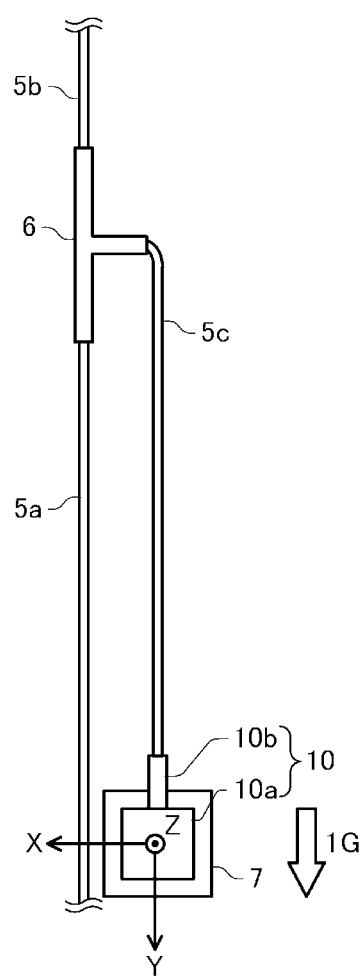
FIG. 6 is a diagram illustrating a state after the sensor is dropped in FIG. 4.

In the example of FIG. 4, when the magnet jig 7 is dropped from the structure for some reason, the sensor 10 is dropped to be in a state as illustrated in FIG. 6, and the direction changes by 90° compared to the time of installation. That is, when the sensor 10 is dropped in the example of FIG. 4, the Y-axis direction of the sensor 10 is the same direction as the gravitational acceleration direction. Accordingly, the gravitational acceleration value in the X-axis direction is 0 G, the gravitational acceleration value in the Y-axis direction is 1 G, and the gravitational acceleration value in the Z-axis direction remains 0 G. Thus, when the sensor 10 is dropped from the state of FIG. 4, a difference between the gravitational acceleration values in the X-axis direction is 1 G, a difference between the gravitational acceleration values in the Y-axis direction is 1 G, and a difference between the gravitational acceleration values in the Z-axis direction is 0 G. Further, if the sensor 10 is dropped from the state in which the magnet jig 7 is attached to the structure such that the X-axis direction of the sensor 10 is in the same direction as the gravitational acceleration direction, the difference between the gravitational acceleration values in the X-axis direction is −1 G, the difference between the gravitation acceleration values in the Y-axis direction is 1 G, and the difference between the gravitational acceleration values in the Z-axis direction is 0 G. Depending on a direction in which the sensor 10 is fixed to the magnet jig 7 or a direction in which the magnet jig 7 is attached to the structure, the difference between the gravitational acceleration values in the X-axis direction, the difference between the gravitational acceleration values in the Y-axis direction, and the difference between the gravitational acceleration values in the Z-axis direction can be either 1 G or −1 G. That is, when the sensor 10 is dropped and the direction is changed by 90° with respect to the time of installation, an absolute value of a difference between the gravitational acceleration value after the sensor 10 is dropped and the gravitational acceleration value when the sensor 10 is installed, in any two directions of the X, Y, and Z axes, is 1 G, and the difference in the direction of the other one axis is 0 G.

Thus, the drop determination unit 212 calculates an absolute value of a difference between the gravitational acceleration value calculated from the acceleration data output from the sensor 10 and the gravitational acceleration value when the sensor 10 is installed, in each of the X-axis direction, the Y-axis direction, and the Z-axis direction, and if the absolute value of the difference between the gravitational acceleration values in any two or more axial directions is greater than a first determination value, the drop determination unit 212 can determine that the sensor 10 is dropped.

Here, since the structure vibrates periodically, the sensor 10 also detects the acceleration based on the vibration of the structure as well as the gravitational acceleration. Accordingly, the acceleration values, which are detected by the sensor 10, in the X-axis direction, the Y-axis direction, and the Z-axis direction do not match the gravitational acceleration values in the X-axis direction, the Y-axis direction, and the Z-axis direction, respectively. Therefore, the drop determination unit 212 calculates representative values of acceleration values, which are detected by the sensor 10, in the X-axis direction, the Y-axis direction, and the Z-axis direction in order to reduce the acceleration value based on the periodic vibration of the structure. An absolute value of a difference between a representative acceleration value detected by the sensor 10 and the gravitational acceleration value specified based on the installation information 221 in any two or more of the X-axis direction, the Y-axis direction, and the Z-axis direction is greater than the first determination value, the drop determination unit 212 determines that the sensor 10 is fallen. The first determination value is set to, for example, 500 mG which is half of 1 G.

If a calculation time of the representative value of the accelerations detected by the sensor 10 is lengthened, the acceleration value based on the periodic vibration of the structure is further reduced, and thereby, a first determination value can be reduced, and the drop determination unit 212 can determine the drop of the sensor 10 even when the sensor 10 is dropped and the direction of 30°, 45°, or 60° is changed compared to the time of installation. However, if the calculation time of the representative value of the acceleration values is too long, a calculation load increases and a calculation accuracy of the representative value can decrease due to influence of a temperature change of the sensor 10, and thus, a calculation time of the representative value of the accelerations may be set appropriately in consideration of a drop form of the sensor 10.

Meanwhile, in the example of FIG. 5, the T-shaped connector 6 is attached to the structure such that the cables 5a and 5b are substantially horizontal, and the magnet jig 7 is attached to the structure such that the Y-axis direction of the sensor 10 is opposite to the gravitational acceleration direction. Accordingly, the gravitational acceleration value in the Y-axis direction is −1 G, and the gravitational acceleration values in the X-axis direction and the Z-axis direction are 0 G. Thus, the installation information 221 includes information indicating that the gravitational acceleration values of the sensor 10 in the X-axis direction, the Y-axis direction, and the Z-axis direction are, for example, 0 G, −1 G, and 0 G, respectively.

Figure 7:
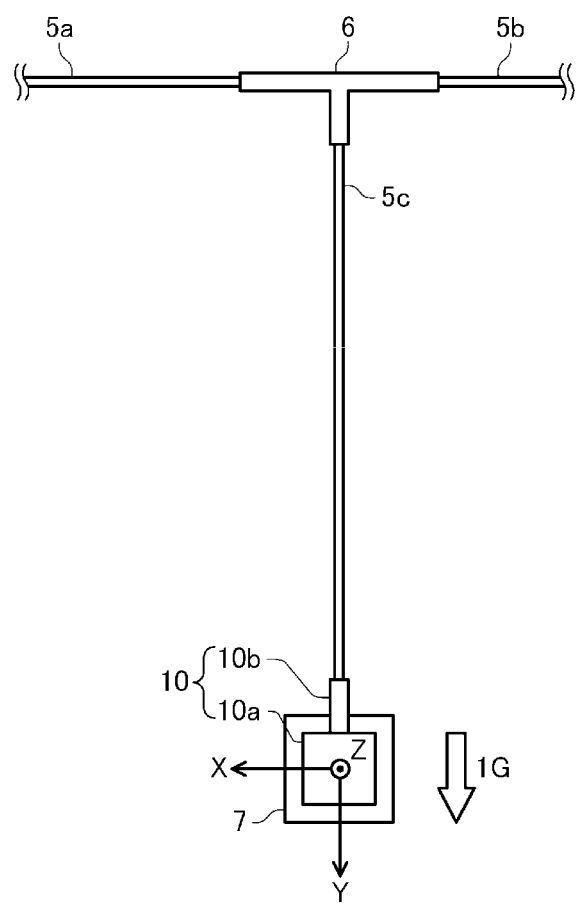
FIG. 7 is a diagram illustrating a state after the sensor is dropped in FIG. 5.

In the example of FIG. 5, when the magnet jig 7 is dropped from the structure for some reason, the sensor 10 falls to be in the state illustrated in FIG. 7, and the direction changes by 180° compared to the time of installation. That is, when the sensor 10 is dropped in the example of FIG. 5, the Y-axis direction of the sensor 10 becomes the same direction as the gravitational acceleration direction. Accordingly, the gravitational acceleration value in the Y-axis direction is 1 G, and the gravitational acceleration values in the X-axis direction and the Z-axis direction remain 0 G. Thus, when the sensor 10 is dropped from the state of FIG. 5, a difference between the gravitational acceleration values in the Y-axis direction is 2 G, and a difference between the gravitational acceleration values in the X-axis direction and the Z-axis direction is 0 G. Further, if the sensor 10 is dropped from the state in which the magnet jig 7 is attached to the structure such that the Y-axis direction of the sensor 10 is in the same direction as the gravitational acceleration direction, the difference between the gravitational acceleration values in the Y-axis direction is −2 G, and the difference between the gravitational acceleration values in the X-axis direction and the Z-axis direction is 0 G. Depending on the direction in which the sensor 10 is fixed to the magnet jig 7 or the direction in which the magnet jig 7 is attached to the structure, the difference between the gravitational acceleration values in the X-axis direction, the difference between the gravitational acceleration values in the Y-axis direction, and the difference between the gravitational acceleration values in the Z-axis direction can all be 2 G or −2 G. That is, when the sensor 10 is dropped and the direction changes by 180° compared to the time of installation, the absolute value of the difference between the gravitational acceleration value after the sensor 10 is dropped and the gravitational acceleration value when the sensor 10 is installed, in any one of the X-axis direction, the Y-axis direction, and the Z-axis direction is 2 G, and the difference in directions of the other two axes is 0 G. Thus, when the sensor 10 is dropped and the direction is changed by 180° compared to the time of installation, it cannot be determined that the sensor 10 is fallen in the condition in which the absolute value of the difference between the gravitational acceleration values in any two or more axial directions is greater than the first determination value.

Therefore, the drop determination unit 212 calculates the absolute value of the difference between the gravitational acceleration value calculated from the acceleration data output from the sensor 10 and the gravitational acceleration value when the sensor 10 is installed, in each of the X-axis direction, the Y-axis direction, and the Z-axis direction, and even when the absolute value of the difference between the gravitational acceleration values in any one or more axial directions is greater than the second determination value, it is determined that the sensor 10 is dropped.

That is, when the absolute value of the difference between the representative value of the acceleration values detected by the sensor 10 and the gravitational acceleration value specified based on the installation information 221 in any one or more of the X-axis direction, the Y-axis direction, and the Z-axis direction is greater than the second determination value, the drop determination unit 212 determines that the sensor 10 is dropped. The second determination value is set to a value greater than the first determination value, for example, 1 G, which is half of 2 G.

1-4. Processing by Measurement Program

Figure 8:
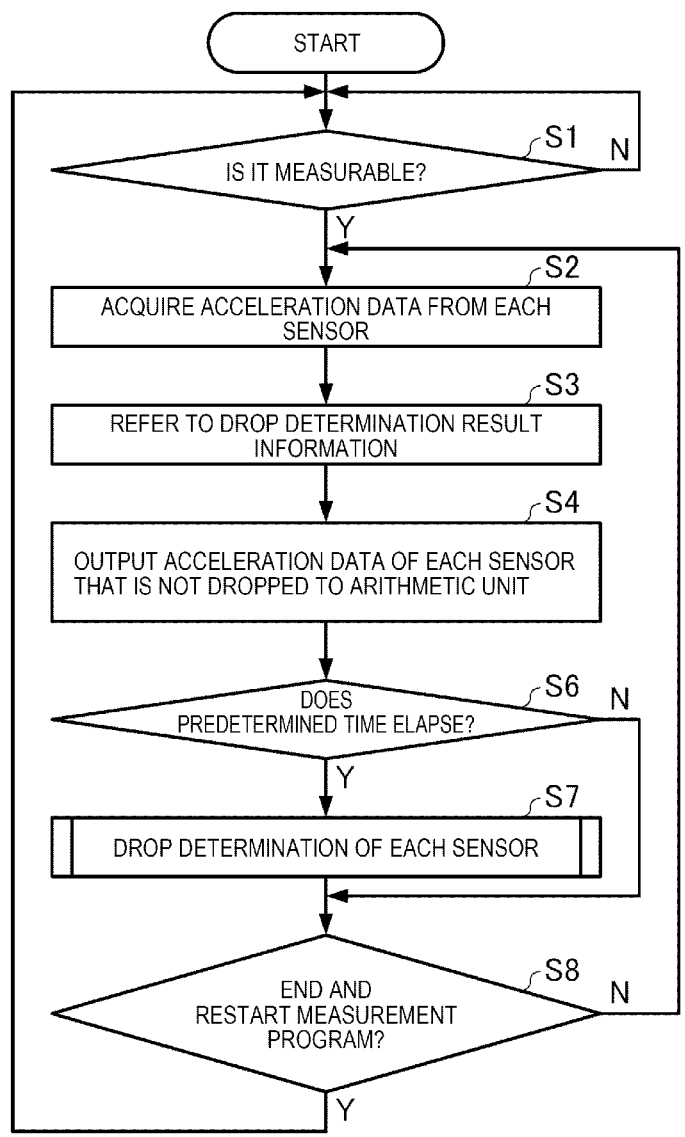
FIG. 8 is a flowchart illustrating an example of a procedure of processing performed by executing a measurement program using a processing unit in the first embodiment.

FIG. 8 is a flowchart illustrating an example of a procedure of processing performed by executing the measurement program 222 using the processing unit 21.

As illustrated in FIG. 8, if the processing unit 21 is in a measurable state (Y in step S1), the processing unit first functions as the data acquisition unit 211 and acquires acceleration data from each sensor 10 (step S2).

Next, the processing unit 21 functions as the drop determination unit 212, refers to the drop determination result information 226 stored in the storage unit 22 (step S3), and outputs the acceleration data of each sensor 10 that is not dropped to the arithmetic unit 213 (step S4). Thus, the arithmetic unit 213 performs arithmetic based on the acceleration data output from the drop determination unit 212, that is, the acceleration value detected by each sensor 10 that is not dropped. In other words, when it is determined that the sensor 10 is dropped, the drop determination unit 212 does not output the acceleration value detected by the sensor 10 to the arithmetic unit 213, and thus, the arithmetic unit 213 does not use the acceleration value detected by the dropped sensor 10 for the arithmetic. Thus, a possibility that the arithmetic unit 213 performs an incorrect arithmetic based on the acceleration value detected by the dropped sensor 10 is reduced.

Next, the processing unit 21 determines whether or not a predetermined time elapses after entering a measurable state or after the drop determination of step S7 is performed in the previous time (step S6), and when the predetermined time elapses (Y in step S6), the processing unit 21 functions as the drop determination unit 212 to perform a drop determination of each sensor 10 (step S7). Further, when the predetermined time did not elapse (N in Step S6), the processing unit 21 does not perform the drop determination in step S7.

The processing unit 21 repeats the processing of steps S2 to S7 until the management unit 215 ends and restarts the measurement program 222 (N in step S8). Further, if the measurement program 222 is ended and restarted by the management unit 215 (Y in step S8), the processing unit 21 enters a measurable state (Y in step S1), and then repeats the processing of steps S2 to S7.

Figure 9:
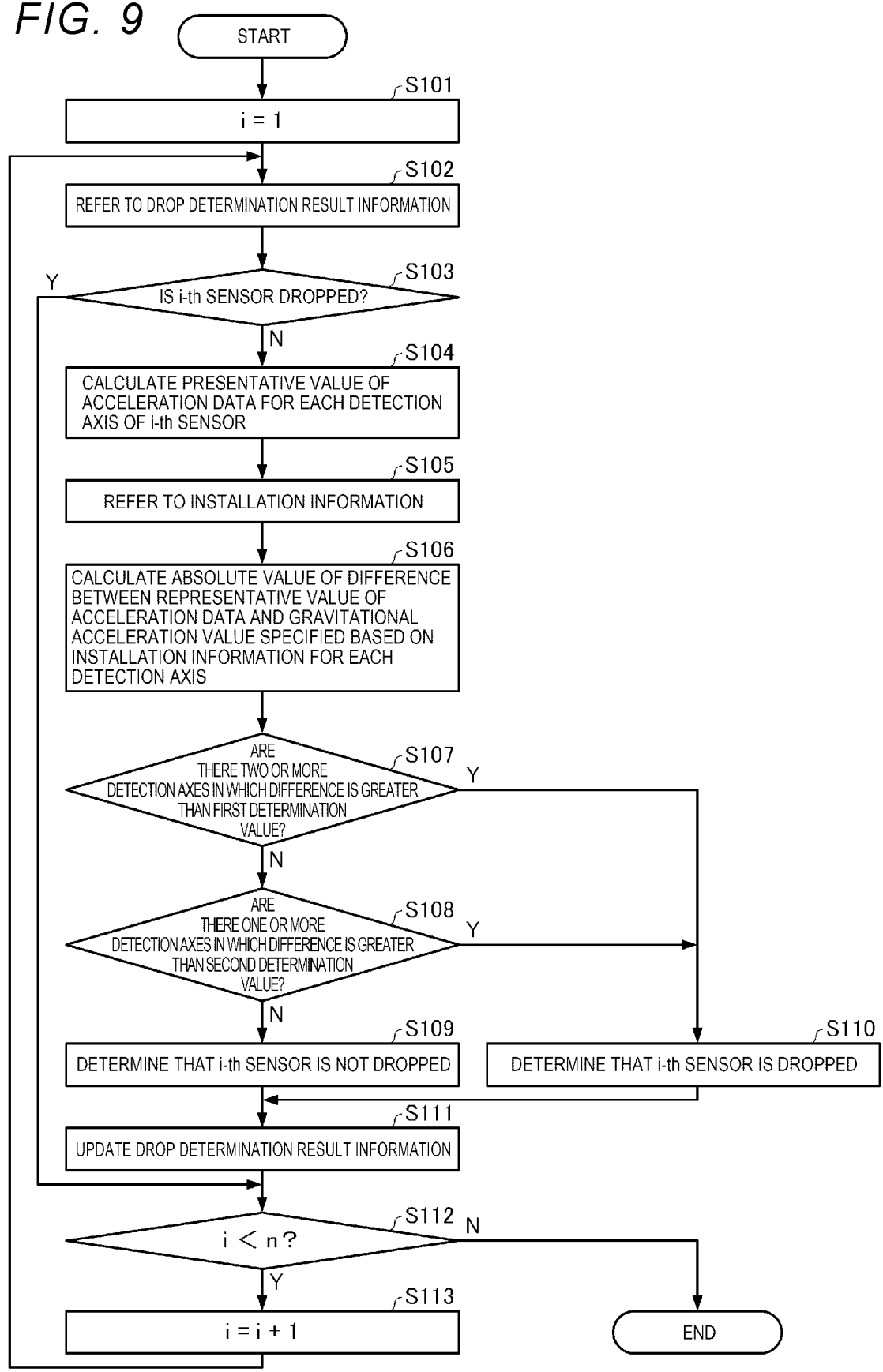
FIG. 9 is a flowchart illustrating an example of a procedure of drop determination processing in the first embodiment.

FIG. 9 is a flowchart illustrating the example of the procedure of the drop determination processing in step S7 of FIG. 8. The processing unit 21 functions as the drop determination unit 212 to perform the processing of steps S101 to S113 in FIG. 9.

First, the drop determination unit 212 sets a variable i to 1 (step S101) and refers to the drop determination result information 226 stored in the storage unit 22 (step S102).

Next, when the drop determination result information 226 indicates that the i-th sensor 10 is not dropped (N in step S103), the drop determination unit 212 calculates a presentative value of the acceleration data for each detection axis of the i-th sensor 10 (step S104).

Next, the drop determination unit 212 refers to the installation information 221 stored in the storage unit 22 (step S105).

Next, the drop determination unit 212 calculates an absolute value of a difference between the representative value of the acceleration data calculated in step S104 and the gravitational acceleration value specified based on the installation information 221 for each detection axis of the i-th sensor 10 (step S106).

When there are not two or more detection axes in which the difference calculated in step S106 is greater than the first determination value (N in step S107) and when there are not one or more detection axes in which the difference calculated in step S106 is greater than the second determination value (N in step S108), the drop determination unit 212 determines that the i-th sensor 10 is not dropped (step S109).

Further, when there are two or more detection axes in which the difference calculated in step S106 is greater than the first determination value (Y in step S107) and when there are one or more detection axes in which the difference calculated in step S106 is greater than the second determination value (Y in step S108), the drop determination unit 212 determines that the i-th sensor 10 is dropped (step S110).

Next, the drop determination unit 212 updates the drop determination result information 226 by using the determination result of step S109 or the determination result of step S110 (step S111).

Further, when the drop determination result information 226 indicates that the i-th sensor 10 is dropped (Y in step S103), the drop determination unit 212 does not perform the processing of steps S104 to S111, that is, the drop determination of the i-th sensor 10.

When the variable i is smaller than the total number n of the sensors 10 (Y in step S112), the drop determination unit 212 increments the variable i by 1 (step S113) and repeats the processing of step S102 and subsequent steps, and when the variable i is equal to n (N in step S112), the drop determination processing ends.

In FIGS. 8 and 9, each time a predetermined time elapses, the drop determination is performed by calculating a representative value and an absolute value of the acceleration data for a predetermined time acquired from each sensor 10, but each time the acceleration data is acquired from each sensor 10, the drop determination may be performed by calculating a movement average value and an absolute value of the acceleration data for a predetermined time, or a movement median value and an absolute value of the acceleration data for a predetermined time.

Step S2 of FIG. 8 is an example of a data acquisition process. Further, step S104 of FIG. 9 is an example of a representative value calculation process. Further, steps S105, S106, S107, S108, S109, and S110 of FIG. 9 are an example of a drop determination process.

1-5. Action Effects

As described above, in the present embodiment, the drop determination unit 212 determines whether or not the sensor 10 is dropped based on a representative value of the respective accelerations in the three axial directions detected by the sensor 10 provided in a structure and the gravitational acceleration value of each of the three axes specified based on the installation information 221 stored in the storage unit 22. That is, the drop determination unit 212 determines that the sensor 10 is dropped based on a difference between a direction of a gravitational acceleration based on the installation information 221 before the sensor 10 is dropped and a direction of a gravitational acceleration based on a value detected by the sensor 10 after the sensor 10 is dropped. Thus, according to a sensor system 1A of the present embodiment or a sensor drop determination method of the present embodiment, it is not necessary to detect a state in which the sensor 10 is dropping, and it can be determined that the sensor is dropped even after the sensor 10 is dropped. Accordingly, for example, even when the sensor 10 is dropped between end of the measurement program 222 and restart thereof, the drop determination unit 212 can determine that the sensor 10 is dropped after the measurement program 222 restarts.

Further, in the present embodiment, when an absolute value of a difference between a representative value of the acceleration values detected by the sensor 10 and the gravitational acceleration value in any two or more of the three axial directions is greater than a first determination value, the drop determination unit 212 determines that the sensor 10 is dropped. Thus, according to the sensor system 1A of the present embodiment or the sensor drop determination method of the present embodiment, for example, when the sensor 10 is dropped and a direction of the sensor 10 changes within a certain range including 90° compared to before the sensor is dropped, it can be determined that the sensor 10 is dropped.

Further, in the present embodiment, when the absolute value of the difference between the representative value of the acceleration values detected by the sensor 10 and the gravitational acceleration value is greater than the second determination value in any one or more of the three axial directions, the drop determination unit 212 determines that the sensor 10 is dropped. Thus, according to the sensor system 1A of the present embodiment or the sensor drop determination method of the present embodiment, for example, when the sensor 10 is dropped and the direction of the sensor 10 changes within a certain range including 180° compared to before the sensor is dropped, it can be determined that the sensor 10 is dropped.

Further, in the present embodiment, the drop determination unit 212 stores the drop determination result in the storage unit 22, and when the determination result stored in the storage unit 22 indicates that the sensor 10 is dropped, the drop determination unit 212 does not perform a subsequent drop determination. Accordingly, for example, in a case where the measurement program 222 is restarted, when the drop determination unit 212 determines that the sensor 10 is dropped before the measurement program is restarted, it is not necessary to perform the drop determination. Thus, according to the sensor system 1A of the present embodiment or the sensor drop determination method of the present embodiment, it is possible to reduce a wasteful power consumption of the sensor system 1 by performing a drop determination with a determined determination result.

Further, in the present embodiment, when it is determined that the sensor 10 is dropped, the drop determination unit 212 does not output the acceleration value detected by the sensor 10 to the arithmetic unit 213. Thus, according to the sensor system 1A of the present embodiment or the sensor drop determination method of the present embodiment, a possibility that the arithmetic unit 213 performs an incorrect arithmetic based on the acceleration value detected by the dropped sensor 10 is reduced.

2. Second Embodiment

Hereinafter, in a second embodiment, the same configuration element as in the first embodiment is denoted by the same reference numeral, content different from the content in the first embodiment will be mainly described, and description overlapping the description of the first embodiment will be omitted or simplified.

2-1. Configuration of Structure Monitoring System

Figure 10:
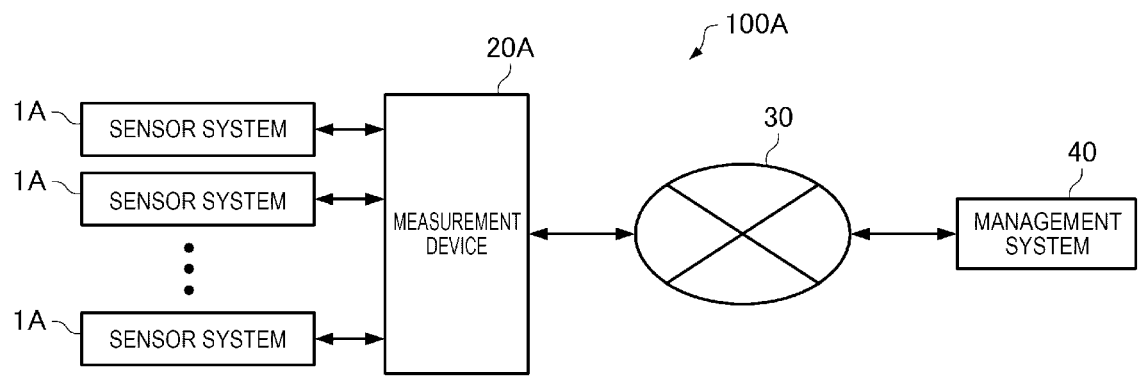
FIG. 10 is a diagram illustrating a configuration of a structure monitoring system according to the second embodiment.

FIG. 10 is a diagram illustrating a configuration of a structure monitoring system according to the second embodiment. As illustrated in FIG. 10, a structure monitoring system 100A includes n sensor systems 1A, a measurement device 20A, and a management system 40. Here, n is an integer greater than or equal to 1.

Each of the n sensor systems 1A and the measurement device 20A are coupled to each other by a communication bus (not illustrated), and the measurement device 20A communicates with then sensor systems 1A via the communication bus. Further, the measurement device 20A communicates with the management system 40 via the communication network 30.

Each of the n sensor systems 1A is provided in a structure, measures an acceleration generated due to vibration of the structure, and transmits the measured acceleration data to the measurement device 20A. For example, the n sensor systems 1A are attached to the building 2 in the structure in the same manner as illustrated in FIG. 2.

The measurement device 20A receives the acceleration data from each of the n sensor systems 1A, generates information on a state of the structure based on the acceleration data, and transmits the information to the management system 40.

2-2. Configuration of Sensor System

Figure 11:
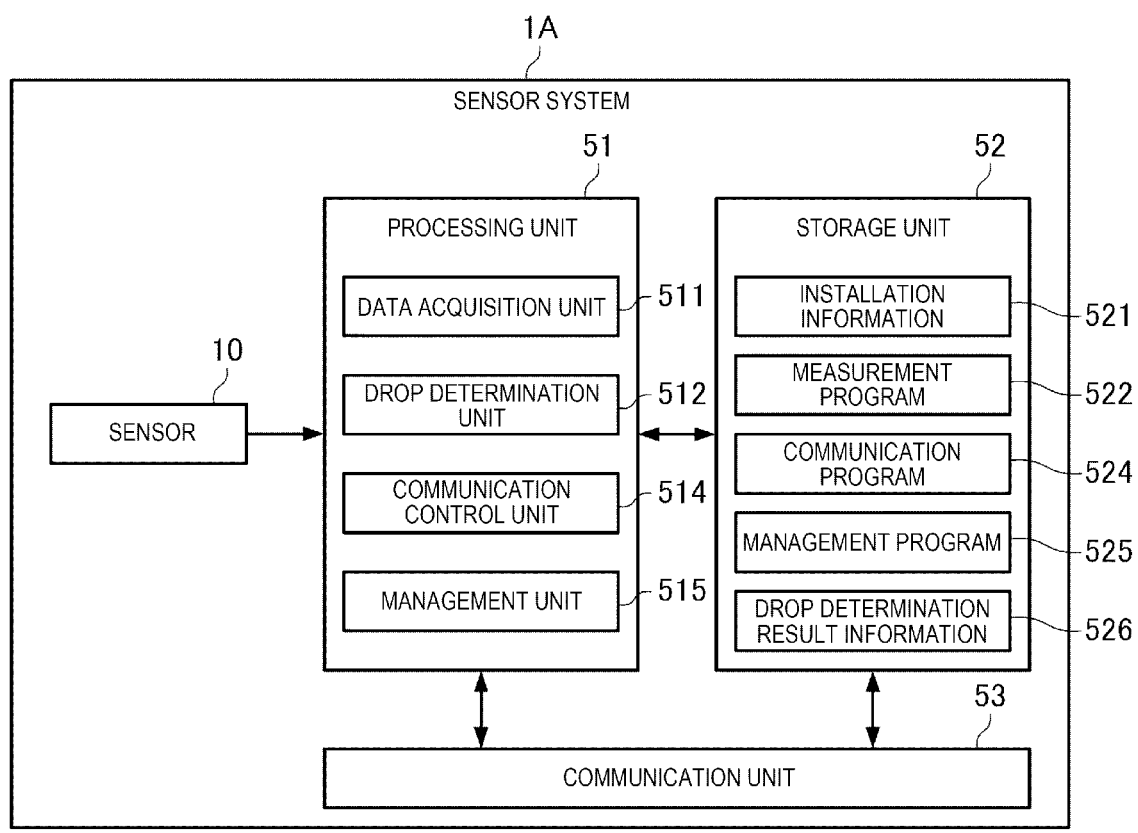
FIG. 11 is a diagram illustrating a configuration example of a sensor system according to the second embodiment.

FIG. 11 is a diagram illustrating a configuration example of the sensor system 1A. As illustrated in FIG. 11, the sensor system 1A includes the sensor 10, a processing unit 51, a storage unit 52, and a communication unit 53.

The sensor 10 is an acceleration sensor that includes a plurality of detection axes in different directions and detects accelerations in directions of the plurality of detection axes.

The storage unit 52 stores installation information 521. The installation information 521 represents a relationship between a direction of a gravitational acceleration and a direction of each detection axis of the sensor 10 in a state where the sensor 10 is attached to the structure. Further, the storage unit 52 stores a measurement program 522, a communication program 524, and a management program 525.

The communication unit 53 is an interface unit for the sensor system 1A to communicate with the measurement device 20A. In the present embodiment, the processing unit 51 transmits the acceleration data acquired from the sensor 10 by a data acquisition unit 511 and information on the determination result by a drop determination unit 512 to the measurement device 20A via the communication unit 53. Further, the measurement device 20A transmits the latest versions of the measurement program 522 and the communication program 524 to the storage unit 52 via the communication unit 53.

The processing unit 51 includes the data acquisition unit 511, the drop determination unit 512, a communication control unit 514, and a management unit 515. In the present embodiment, the processing unit 51 is a processor and functions as the respective units by executing various programs stored in the storage unit 52 that is an information storage device. Specifically, the processing unit 51 functions as the data acquisition unit 511 and the drop determination unit 512 by executing the measurement program 522. Further, the processing unit 51 functions as the communication control unit 514 by executing the communication program 524. Further, the processing unit 51 functions as the management unit 515 by executing the management program 525.

The data acquisition unit 511 acquires acceleration data that is an output signal of the sensor 10. The data acquisition unit 511 transmits the acquired acceleration data to the measurement device 20A via the communication unit 53.

The drop determination unit 512 determines whether or not sensor 10 is dropped based on a representative value of accelerations in the directions of the respective detection axes detected by the sensor 10 and gravitational acceleration values in the directions of the respective detection axes of the sensor 10 specified based on the installation information 521. Then the drop determination unit 512 determines whether or not the sensor 10 is dropped at a predetermined cycle and stores the determination result in the storage unit 52 as drop determination result information 526. The drop determination unit 512 transmits the determination result to the measurement device 20A via the communication unit 53. That is, the communication unit 53 functions as an output unit that outputs the determination result by the drop determination unit 512 to the outside of the sensor system 1A.

The communication control unit 514 controls a communication operation of the communication unit 53 with the measurement device 20A.

The management unit 515 monitors whether or not the data acquisition unit 511, the drop determination unit 512, and the communication control unit 514 normally operate. When any of the data acquisition unit 511, the drop determination unit 512, and the communication control unit 514 performs an abnormal operation, the management unit 515 ends a corresponding program and restarts the program. Further, the management unit 515 monitors whether or not the latest versions of the measurement program 522 and the communication program 524 are stored in the storage unit 52. When the latest version of any program is stored in the storage unit 52, the management unit 515 ends the corresponding program, updates the program to the latest version, and then restarts.

2-3. Configuration of Measurement Device

Figure 12:
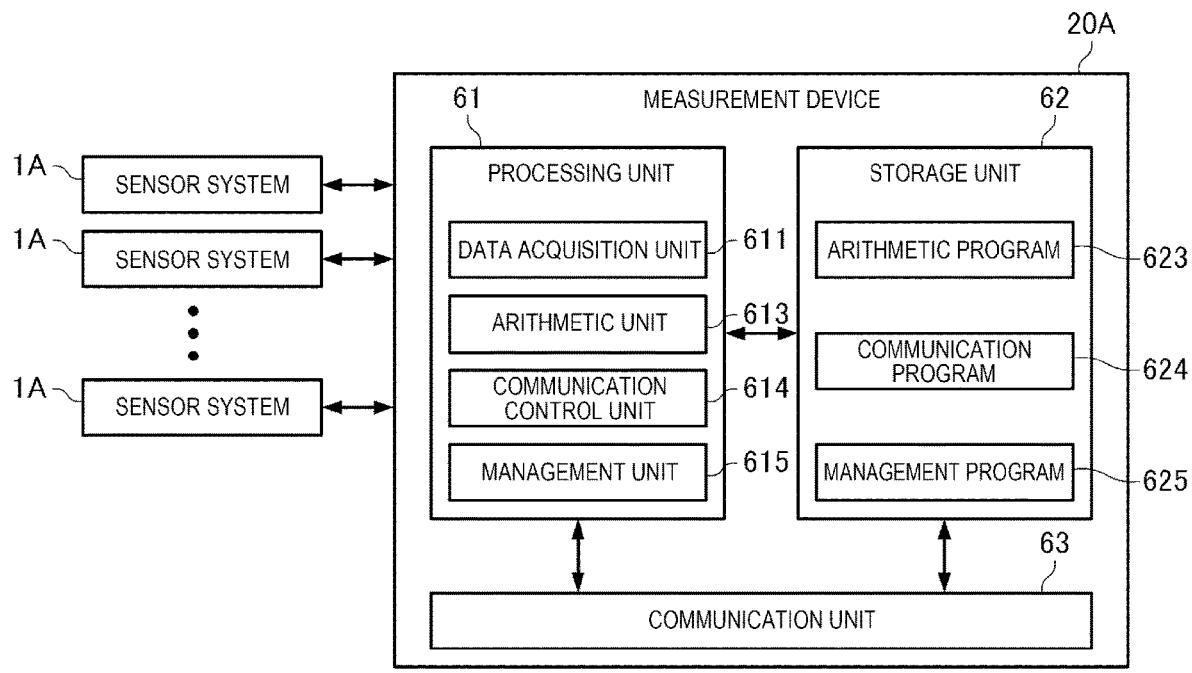
FIG. 12 is a diagram illustrating a configuration example of a measurement device according to the second embodiment.

FIG. 12 is a diagram illustrating a configuration example of the measurement device 20A. As illustrated in FIG. 12, the measurement device 20A includes a processing unit 61, a storage unit 62, and a communication unit 63.

The storage unit 62 stores an arithmetic program 623, a communication program 624, and a management program 625.

The communication unit 63 is an interface unit for the measurement device 20A to communicate with the management system 40. In the present embodiment, the processing unit 61 transmits various types of information obtained by performing arithmetic by using the arithmetic unit 613 to the management system 40 via the communication unit 63. Further, the management system 40 transmits the latest versions of various programs to the storage unit 62 via the communication unit 63.

The processing unit 61 includes a data acquisition unit 611, an arithmetic unit 613, a communication control unit 614, and a management unit 615.

In the present embodiment, the processing unit 61 is a processor, and functions as the respective units by executing various programs stored in the storage unit 62 that is an information storage device. Specifically, the processing unit 61 functions as the data acquisition unit 611 and the arithmetic unit 613 by executing the arithmetic program 623. Further, the processing unit 61 functions as the communication control unit 614 by executing the communication program 624. Further, the processing unit 61 functions as the management unit 615 by executing the management program 625.

The data acquisition unit 611 acquires acceleration data that is output signals of the n sensor systems 1A and a determination result of the drop determination of the sensor 10. Then, the data acquisition unit 611 outputs the acceleration data from the sensor system 1A determined that the sensor 10 is not dropped to the arithmetic unit 613. In other words, the data acquisition unit 611 does not output the acceleration data from the sensor system 1A determined that the sensor 10 is dropped to the arithmetic unit 613.

The arithmetic unit 613 performs arithmetic based on acceleration data output from the data acquisition unit 611.

The arithmetic unit 613 performs arithmetic for calculating, for example, a displacement of the structure, a degree of fatigue, and the like.

The communication control unit 614 controls a communication operation by the communication unit 63 with the management system 40.

The management unit 615 monitors whether or not the data acquisition unit 611, the arithmetic unit 613, and the communication control unit 614 normally operate. When any of the data acquisition unit 611, the arithmetic unit 613, and the communication control unit 614 performs an abnormal operation, the management unit 615 ends a corresponding program and restarts the program. Further, the management unit 615 monitors whether or not the latest versions of the arithmetic program 623 and the communication program 624 are stored in the storage unit 62. When the latest version of any program is stored in the storage unit 62, the management unit 615 ends the corresponding program, updates the program to the latest version, and then restarts the program. Further, if the management unit 615 receives the latest version of the measurement program 522 from the management system 40 via the communication unit 63, the management unit 615 transmits the latest version of the measurement program 522 to the respective sensor systems 1A.

2-4. Processing by Measurement Program

Figure 13:
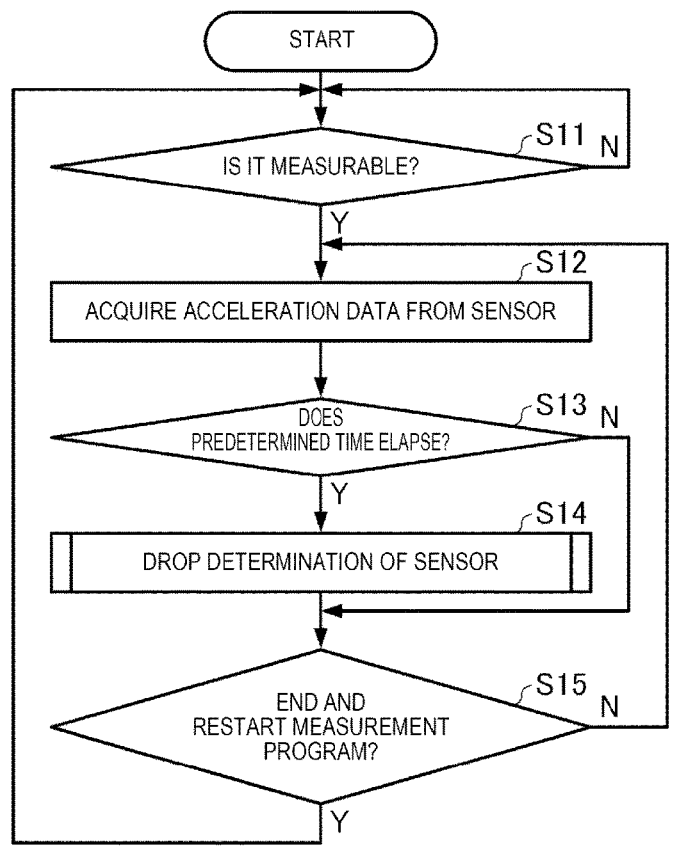
FIG. 13 is a flowchart illustrating an example of a procedure of processing performed when a processing unit executes a measurement program according to the second embodiment.

FIG. 13 is a flowchart illustrating an example of a procedure of processing performed by executing the measurement program 522 by using the processing unit 51.

As illustrated in FIG. 13, if the processing unit 51 is in a measurable state (Y in Step S11), the processing unit 51 first functions as the data acquisition unit 211 and acquires acceleration data from the sensor 10 (Step S12).

Next, the processing unit 51 determines whether or not a predetermined time elapses after entering a measurable state or after the drop determination of step S14 is performed in the previous time (step S13), and when the predetermined time elapses (Y in step S13), the processing unit 51 functions as the drop determination unit 512 to perform a drop determination of each sensor 10 (step S14). Further, when the predetermined time did not elapse (N in Step S13), the processing unit 51 does not perform the drop determination in step S14.

Then, the processing unit 51 repeats the processing of steps S12 to S14 until the management unit 515 ends and restarts the measurement program 522 (N in step S15). Further, if the management unit 515 ends and restarts the measurement program 522 (Y in step S15), the processing unit 51 enters a measurable state (Y in step S11), and then, repeats the processing of steps S12 to S14.

Figure 14:
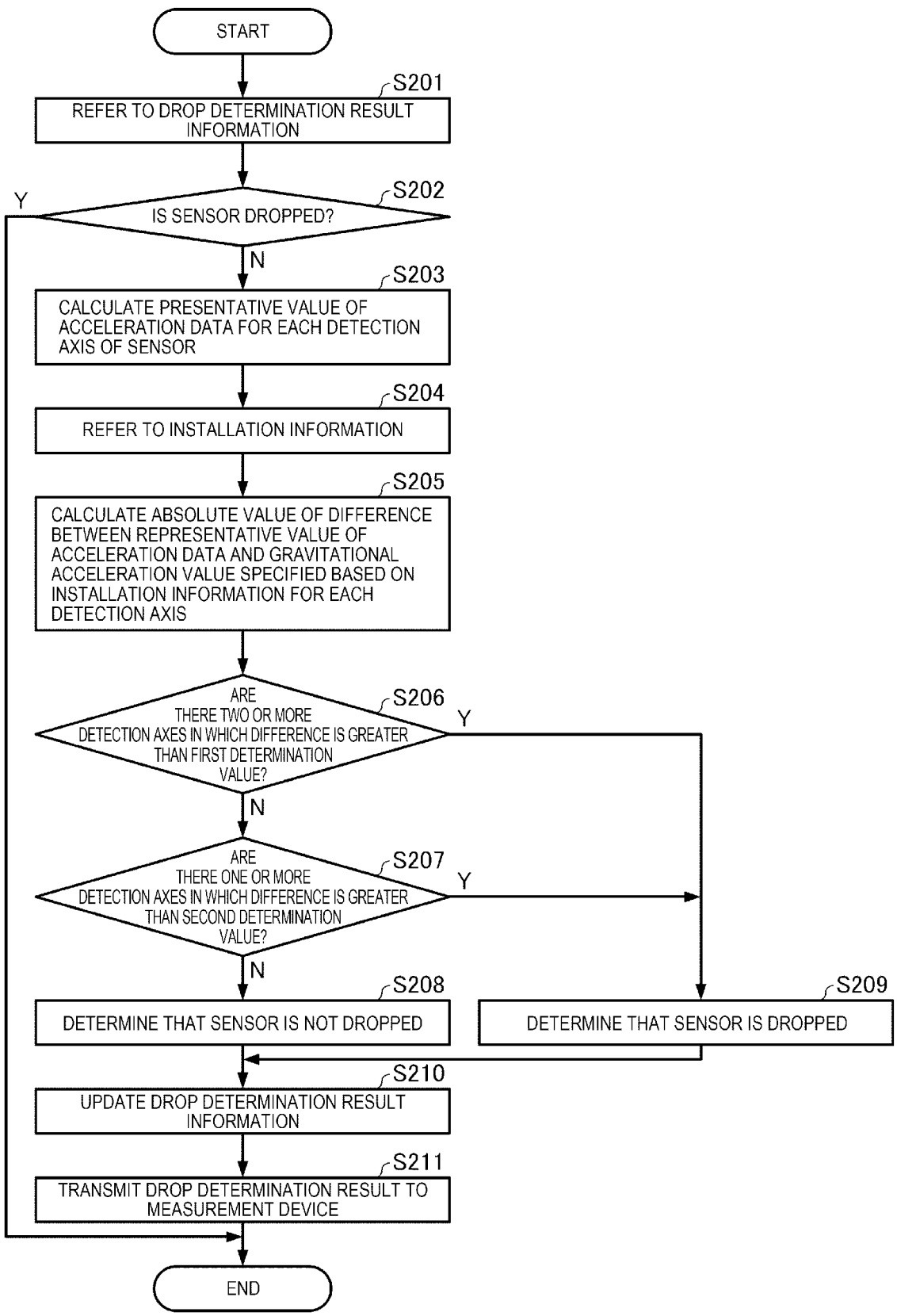
FIG. 14 is a flowchart illustrating an example of a procedure of a drop determination processing according to the second embodiment.

FIG. 14 is a flowchart illustrating an example of a procedure of the drop determination processing of step S14 in FIG. 13. The processing unit 51 functions as the drop determination unit 512 and performs the processing of steps S201 to S211 in FIG. 14.

First, the drop determination unit 512 refers to the drop determination result information 526 stored in the storage unit 52 (step S201).

Next, when the drop determination result information 526 indicates that the sensor 10 is not dropped (N in step S202), the drop determination unit 512 calculates a representative value of acceleration data for each detection axis of the sensor 10 (step S203).

Next, the drop determination unit 512 refers to the installation information 521 stored in the storage unit 52 (step S204).

Next, the drop determination unit 512 calculates an absolute value of a difference between the representative value of the acceleration data calculated in step S203 and the gravitational acceleration value specified based on the installation information 521 for each detection axis of the sensor 10 (step S205).

When there are not two or more detection axes in which the difference calculated in step S205 is greater than the first determination value (N in step S206), and when there are not one detection axis or more in which the difference calculated in step S205 is greater than the second determination value (N in step S207), the drop determination unit 512 determines that the sensor 10 is not dropped (step S208).

Further, when there are two or more detection axes in which the difference calculated in step S205 is greater than the first determination value (Y in step S206), and when there are one detection axis or more in which the difference calculated in step S205 is greater than the second determination value (Y in step S207), the drop determination unit 512 determines that the sensor 10 is dropped (step S209).

Next, the drop determination unit 512 updates the drop determination result information 526 by using the determination result of step S208 or the determination result of step S209 (step S210).

Then, the drop determination unit 512 transmits the determination result of step S208 or the determination result of step S209 to the measurement device 20A via the communication unit 53 (step S211) and ends the drop determination processing.

Further, when the drop determination result information 526 indicates that the sensor 10 is dropped (Y in step S202), the drop determination unit 512 ends the drop determination processing without performing the processing of steps S203 to S211.

In FIGS. 13 and 14, each time a predetermined time elapses, the drop determination is performed by calculating the representative value of the acceleration data acquired from the sensor 10 for a predetermined time and an absolute value thereof, but each time the acceleration data is acquired from the sensor 10, the drop determination may be performed by calculating a movement average value of the acceleration data for a predetermined time and an absolute value thereof, or a movement median value and an absolute value thereof.

Step S12 of FIG. 13 is an example of a data acquisition process. Further, step S203 of FIG. 14 is an example of a representative value calculation process. Further, steps S204, S205, S206, S207, S208, and S209 of FIG. 14 are an example of a drop determination process.

2-5. Action Effects

According to the sensor system 1A and the sensor drop determination method of the second embodiment described above, the same effects as in the first embodiment can be obtained.

Further, according to the sensor system 1A and the sensor drop determination method of the second embodiment, since the communication unit 53 functions as an output unit that outputs a determination result by the drop determination unit 512 to the outside of the sensor system 1A, a possibility that a device coupled to the sensor system 1A performs an erroneous calculation based on the acceleration value detected by the dropped sensor 10 is reduced.

3. Modification Examples

The present disclosure is not limited to the present embodiment, and various modifications can be made within the scope of the gist of the present disclosure.

For example, in the embodiments described above, the example in which the sensor 10 or the sensor system 1A is installed in the building 2 is described, but the structure to which the sensor 10 or the sensor system 1A is attached is not limited to the building and may be, for example, a power transmission tower, a wind power generator, an electronic bulletin board of a road, or the like.

Further, for example, in each of the above-described embodiments, a drop determination for the sensor 10 determined to be dropped is not performed thereafter but the drop determination may be periodically performed even thereafter. By doing so, when an operator returns the dropped sensor 10 or sensor system 1A to the original position, even if updating the drop determination result information 226 or the drop determination result information 526 is forgotten, the drop determination unit 212 or the drop determination unit 512 can determine that the sensor 10 is not dropped, and thus, the arithmetic unit 213 or the arithmetic unit 613 can perform arithmetic by using the acceleration data output from the sensor 10.

Further, for example, in each of the above-described embodiments, the sensor 10 has three detection axes, but the number of detection axes may be one, two, four or more. In a case where the sensor 10 has one detection axis, when the absolute value of the difference between the representative value of the acceleration values detected by the sensor 10 and the gravitational acceleration value specified based on the installation information 221 is greater than the determination value, the drop determination unit 212 or the drop determination unit 512 may determine that the sensor 10 is dropped. Further, when the number of detection axes of the sensor 10 is two, four or more, the drop determination unit 212 or the drop determination unit 512 may perform the drop determination using the first determination value and the drop determination using the second determination value in the same manner as in each of the above-described embodiments.

Further, for example, in each of the above-described embodiments, the drop determination unit 212 or the drop determination unit 512 performs both the drop determination using the first determination value and the drop determination using the second determination value but may perform only one of the drop determinations. For example, if the sensor 10 or the sensor system 1A is necessarily installed as in the example of FIG. 4, the drop determination unit 212 or the drop determination unit 512 may perform only the drop determination using the first determination value described above, and if the sensor 10 or the sensor system 1A is necessarily installed as in the example of FIG. 5, the drop determination unit 212 or the drop determination unit 512 may perform only the drop determination using the second determination value described above.

Further, for example, in each of the above-described embodiments, the drop determination unit 212 or the drop determination unit 512 determines that the sensor 10 is dropped when the absolute value of the difference between the representative values of the acceleration values detected by the sensor 10 and the gravitational acceleration value specified based on the installation information 221 or the installation information 521 is greater than the first determination value, but a comparison target with the first determination value is not limited to this. For example, the drop determination unit 212 or the drop determination unit 512 may determine that the sensor 10 is dropped when a difference between the absolute value of the representative value of the accelerations detected by the sensor 10 and the absolute value of the gravitational acceleration value specified based on the installation information 221 or the installation information 521 is greater than the first determination value. Even in this case, when the sensor 10 or the sensor system 1A drops from the state illustrated in FIG. 4 to be in the state illustrated in FIG. 6, the drop determination unit 212 or the drop determination unit 512 can determine that the sensor 10 is dropped.

Figure 15:
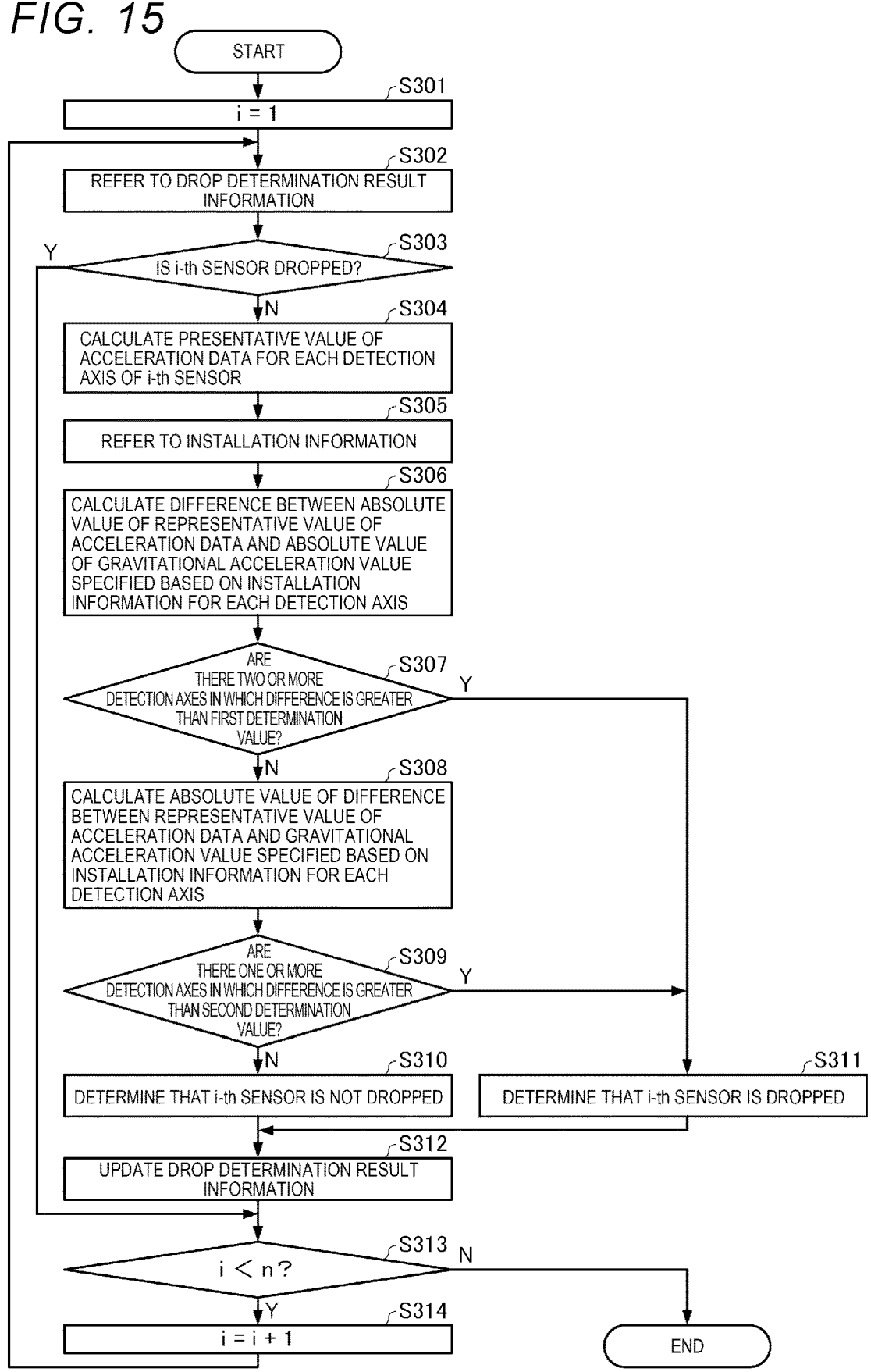
FIG. 15 is a flowchart illustrating an example of a procedure of drop determination processing according to a modification example.

FIG. 15 is a flowchart illustrating an example of a procedure of the drop determination processing of step S7 in FIG. 8. The processing unit 21 functions as the drop determination unit 212 and performs processing of steps S301 to S314 in FIG. 15.

First, the drop determination unit 212 sets a variable i to 1 (step S301) and refers to the drop determination result information 226 stored in the storage unit 22 (step S302).

Next, when the drop determination result information 226 indicates that the i-th sensor 10 is not dropped (N in step S303), the drop determination unit 212 calculates the representative value of the acceleration data for each detection axis of the i-th sensor 10 (step S304).

Next, the drop determination unit 212 refers to the installation information 221 stored in the storage unit 22 (step S305).

Next, the drop determination unit 212 calculates a difference between an absolute value of the representative value of the acceleration data calculated in step S104 and an absolute value of the gravitational acceleration value specified based on the installation information 221 for each detection axis of the i-th sensor 10 (step S306).

When there are not two or more detection axes in which the difference calculated in step S306 is greater than the first determination value (N in step S307), the drop determination unit 212 calculates an absolute value of a difference between the representative value of the acceleration data calculated in step S304 and the gravitational acceleration value specified based on the installation information 221 for each detection axis (step S308).

When there is not one detection axis or more in which the difference calculated in step S308 is greater than the second determination value (N in step S309), the drop determination unit 212 determines that the i-th sensor 10 is not dropped (step S310).

Further, when there are two or more detection axes in which the difference calculated in step S306 is greater than the first determination value (Y in step S307), or when there is one detection axis or more in which the difference calculated in step S308 is greater than the second determination value (Y in step S309), the drop determination unit 212 determines that the i-th sensor 10 is dropped (step S311).

Next, the drop determination unit 212 updates the drop determination result information 226 by using the determination result in step S310 or the determination result of step S311 (step S312).

When the drop determination result information 226 indicates that the i-th sensor 10 is dropped (Y in step S303), the drop determination unit 212 does not perform the processing of steps S304 to S312, that is, the drop determination of the i-th sensor 10.

When the variable i is smaller than the total number n of sensors 10 (Y in step S313), the drop determination unit 212 increments the variable i by 1 (step S314) and repeats the processing of step S302 and subsequent steps, and if the variable i is equal to n (N in step S313), the drop determination process ends.

The flowchart illustrating the example of the procedure of the drop determination processing of step S14 in FIG. 13 according to the modification example is the same as the flowchart in FIG. 15 in which steps S301, S313, and S314 are removed and the "i-th sensor" is replaced with the "sensor", and thus, illustration and description thereof are omitted.

Step S304 of FIG. 15 is an example of a representative value calculation process. Further, steps S305, S306, S307, S308, S309, S310, and S311 of FIG. 15 are an example of a drop determination step.

The above-described embodiments and modification examples are examples, and the present disclosure is not limited to these. For example, it is possible to appropriately combine each embodiment and each modification example. Further, the representative value according to the above-described embodiments and modification examples may be an average value or a median value.

The present disclosure includes a configuration that is substantially the same as the configuration described in the embodiment, for example, a configuration that has the same function, method, and result, or a configuration that has the same object and effect. Further, the present disclosure includes a configuration in which a non-essential portion of the configuration described in the embodiment is replaced. Further, the present disclosure includes a configuration that exhibits the same action effect as the configuration described in the embodiment or a configuration that can achieve the same object. Further, the present disclosure includes a configuration in which a known technique is added to the configuration described in the embodiment.

What is claimed is:

1. A sensor system comprising:
 a plurality of sensors that are provided in a structure and detects an acceleration;
 a storage unit that stores installation information indicating a relationship between a direction of a gravitational acceleration and a direction of a detection axis of each of the plurality of sensors, the installation information comprising a gravitational acceleration value of each of the plurality of sensors at the time of installation of each of the plurality of sensors on the structure; and
 a drop determination unit that determines a determination result of whether or not each of the plurality of sensors is dropped from the structure based on a representative value of accelerations in the direction of the detection axis and the gravitational acceleration value in the direction of the detection axis specified based on the installation information,
 an arithmetic unit that performs arithmetic based on an acceleration value detected by the sensor, and
 wherein, each of the plurality of sensors has a plurality of the detection axes in different directions,
 the drop determination unit determines that a first sensor of the plurality of sensors is dropped when an absolute value of a difference between the representative value of the accelerations detected by the first sensor and the gravitational acceleration value, on a per direction of the detection axis basis, is greater than a first determination value in any two of the directions of the plurality of the detection axes,
 the drop determination unit determines that the first sensor is dropped when the absolute value of the difference is greater than a second determination value, on a per direction of the detection axis basis, in any one of the directions of the plurality of the detection axes,
 when it is determined that the first sensor is dropped, the drop determination unit does not output the acceleration value detected by the first sensor to the arithmetic unit but outputs the acceleration values detected by a remainder of the plurality of sensors, and the storage unit stores the determination result by the drop determination unit, and the drop determination unit does not perform the determination for the first sensor when the determination result stored in the storage, unit indicates that the first sensor is dropped.

2. The sensor system according to claim 1, wherein the representative value is an average value or a median value.

3. The sensor system according to claim 1, further comprising: an output unit that outputs a determination result by the drop determination unit to an outside of the sensor system.

4. A sensor drop determination method comprising:
a data acquisition step of acquiring an output signal of a plurality of sensors that are provided in a structure and detects an acceleration;
a representative value calculation step of calculating a representative value of accelerations in a direction of a detection axis detected by each of the plurality of sensors, based on an output signal of each of the plurality of sensors, except those representative values for any dropped sensor are not output; and
a drop determination step of determining whether or not one of the plurality of sensors is dropped from the structure based on the representative value of the acceleration in the direction of the detection axis, and a gravitational acceleration value in the direction of the detection axis specified based on installation information indicating a relationship between a direction of a gravitational acceleration stored in a storage unit and the direction of the detection axis of the one sensor of the plurality of sensors, the installation information comprising the gravitational acceleration value of the one sensor of the plurality of sensors at the time of installation of the one sensor of the plurality of sensors on the structure, wherein, the one sensor of the plurality of sensors has a plurality of the detection axes in different directions, the drop determination step comprising:
determining that the one sensor is dropped when an absolute value of a difference between the representative value of the accelerations detected by the one sensor and the gravitational acceleration value, on a per direction of the detection axis basis, is greater than a first determination value in any, two of the directions of the plurality of the detection axes, determining that the one sensor is dropped when the absolute value of the difference is greater than a second determination value, on a per direction of the detection axis basis, in any, one of the directions of the plurality of the detection axes, and storing a determination result from the drop determination step in a storage unit, and not performing the drop determination step for any sensor of the plurality of sensors that is dropped.

5. The sensor system according to claim 1, wherein when the sensor is dropped, the direction of the detection axis changes compared to the time of installation.

6. The sensor system according to claim 4, wherein when the sensor is dropped, the direction of the detection axis changes compared to the time of installation.

* * * * *